US009664233B2

(12) United States Patent
Arnault

(10) Patent No.: US 9,664,233 B2
(45) Date of Patent: May 30, 2017

(54) ENGAGEMENT-DISENGAGEMENT, SUSPENSION OR STEERING RELEASE BEARING, AND MOTOR VEHICLE EQUIPPED WITH SUCH A RELEASE BEARING

(71) Applicant: Benoit Arnault, Saint-Cyr-sur-Loire (FR)

(72) Inventor: Benoit Arnault, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 29 days.

(21) Appl. No.: 14/799,630

(22) Filed: Jul. 15, 2015

(65) Prior Publication Data

US 2016/0017925 A1    Jan. 21, 2016

(30) Foreign Application Priority Data

Jul. 17, 2014 (FR) ...................................... 14 56877

(51) Int. Cl.
*F16C 33/76* (2006.01)
*F16C 33/78* (2006.01)
*F16D 23/14* (2006.01)
*F16C 19/16* (2006.01)

(52) U.S. Cl.
CPC .......... *F16C 33/761* (2013.01); *F16C 19/163* (2013.01); *F16C 33/78* (2013.01); *F16C 33/7826* (2013.01); *F16C 33/7856* (2013.01); *F16D 23/14* (2013.01); F16C 2361/43 (2013.01); F16D 2300/08 (2013.01)

(58) Field of Classification Search
CPC .............. F16C 33/7869; F16C 33/7873; F16C 33/7876
See application file for complete search history.

(56) References Cited

U.S. PATENT DOCUMENTS 2,755,113 A    7/1956  Baumheckel
3,989,259 A *  11/1976 Lorenz ................ F16C 33/7853
                                           277/565

FOREIGN PATENT DOCUMENTS

EP    773384 A1    11/1934
FR    2760501 A1    9/1998
FR    2984435 A1    6/2013
FR    2984978 A1 *  6/2013  ............ F16C 33/783

* cited by examiner

Primary Examiner — Thomas R. Hannon
(74) Attorney, Agent, or Firm — Bryan Peckjian; SKF USA Inc. Patent Dept.

(57) ABSTRACT

An engagement-disengagement, suspension or steering release bearing. The release bearing includes a rolling bearing forming a member for transmitting an axial force and comprising a rotating ring and a non-rotating ring between which a rolling chamber is mounted for rolling bodies and a sealing gasket, which is mounted on a first ring among the rotating and non-rotating rings, and which comprises a framework, having an edge folded down radially toward a groove arranged on a surface of the first ring, and a fitting, having a sealing lip in sliding bearing against, or adjacent to, a corresponding surface of the second ring, The fitting of the seal is suitable for filling the groove of the first ring and part of the fitting is jammed between the folded down edge of the framework and the groove in the configuration with the seal mounted on the first ring.

10 Claims, 3 Drawing Sheets

ENGAGEMENT-DISENGAGEMENT, SUSPENSION OR STEERING RELEASE BEARING, AND MOTOR VEHICLE EQUIPPED WITH SUCH A RELEASE BEARING

CROSS REFERENCE TO RELATED APPLICATIONS

This is a Non-Provisional Patent Application, filed under the Paris Convention, claiming the benefit of French Patent (FR) Application Number 1456877, filed on 17 Jul. 2014, which is incorporated herein by reference in its entirety.

TECHNICAL FIELD

The invention relates to an engagement-disengagement, suspension or steering release bearing used in a motor vehicle to transmit an axial force between a non-rotating part, such as an actuating piston, and a rotating part, such as the noses of a transmission diaphragm.

BACKGROUND ART

In the automobile industry, it is known to use an engagement-disengagement release bearing to actuate the rotating diaphragm of a transmission from a translatable piston. To that end, the release bearing comprises a rolling bearing with rolling bodies, with a rotating ring designed to be in contact with the noses of the diaphragm, and a non-rotating ring that defines a central opening in which a maneuvering member is engaged secured to the piston or made up by a part thereof.

When such a release bearing is formed, it is essential for it not to be easy to disassemble, inasmuch as it is not always mounted in a corresponding housing or on a corresponding shaft as of its manufacture. Under these conditions, the inner and outer rings of such a release bearing may be subject to a separating force that is at least partially parallel to the rotation axis of the rolling bearing. When they are subjected to such a force, even with a relatively low intensity, the rings of the known release bearings tend to move axially away from one another. This may lead to the opening of the rolling chamber in which the rolling bodies are normally housed, and the loss of at least some of them.

Similar problems arise with the suspension release bearings and steering release bearings used in motor vehicles.

To offset these drawbacks, it is known to use an axial retaining seal, which is mounted between the two rings of the release bearing and which retains the outer ring or the inner ring when a separating force is applied on the release bearing. This seal further makes it possible to keep the grease near the rolling elements during operation and prevent the infiltration of outside particles in the rolling chamber.

Seals exist comprising a framework, which is crimped around the outer ring of the rolling bearing and which, as a result, forms an effective release bearing with respect to a pulling out force exerted on the rings. However, this type of seal increases the outer diameter of the rolling bearing, which is why seals anchored in the bore of the outer ring were developed.

In particular, FR-A-2,984,435 discloses a seal of this type, which is assembled within an engagement release bearing. This seal includes a rigid framework and a flexible fitting. The rigid framework comprises an edge, which is folded down radially toward a groove delimited on an inner radial surface of the outer ring. When the rings of the rolling bearing are subjected to a separating force, which is at least partially parallel to the axis of rotation of the rolling bearing, the rolling elements exert a reaction force on the seal and the framework of the latter deforms. The folded edge of the framework then becomes housed in the groove of the outer ring and forms a release bearing with respect to the reaction force, or pulling out force, exerted by the rolling bodies of the rolling bearing. However, the strength of this assembly is insufficient in case of significant separating force.

BRIEF SUMMARY OF THE PRESENT INVENTION

The invention more particularly aims to resolve these problems by proposing a new engagement-disengagement, suspension or steering release bearing having a greater resistance to a separating force of the rolling bearing rings, while remaining compact.

To that end, the invention relates to an engagement-disengagement, suspension or steering release bearing, the release bearing comprising a rolling bearing forming a member transmitting an axial force and comprising a retaining ring and a non-rotating ring between which a rolling chamber is defined for rolling bodies, a sealing gasket, which is mounted on a first ring among the rotating and non-rotating rings, and which comprises a framework, having an edge folded down radially toward a groove arranged on a surface of the first ring, and a fitting, having a sealing lip in sliding bearing against, or adjacent to, a corresponding surface of the second ring. According to the invention, the fitting of the seal is suitable for filling the groove of the first ring and part of the fitting is jammed between the folded down edge of the framework and the groove in the configuration with the seal mounted on the first ring.

Owing to the invention, when a separating force, at least partially axial, is applied on the rings of the rolling bearing, the rolling bodies exert a reaction force to the separating force on the seal, which tends to push the folded down edge of the framework of the seal toward the groove arranged in the first ring. The part of the fitting comprised between the framework of the seal and the groove is therefore compressed on the one hand, and sheared on the other hand. In fact, the adherence force of the first ring on the fitting of the seal and the reaction force of the beads are two globally opposing forces, which share the part of the fitting filling the groove. This shearing of the material is even greater when the separating force applied is high. The separating force of the rings therefore results in the formation of a shear stress at the fitting. The latter being flexible, it withstands high shear stresses, which gives the release bearing a significant resistance to disassembly.

According to advantageous, but optional aspects of the invention, a rolling bearing may include one or more of the following features, considered in any technically allowable combination:

- The part of the fitting jammed between the folded down edge of the framework and the groove is provided to be sheared during the application of an axial separating force applied on the rings of the rolling bearing.
- The rolling bodies are suitable for exerting a reaction force to the axial separating force on the seal, which may push the folded down edge of the framework toward the groove and shear the fitting part jammed between the two.
- The groove is arranged on an inner radial surface of the outer ring.

The outer diameter of the framework is smaller than the diameter of the inner radial surface of the outer ring.

The difference in diameter between the outer diameter of the framework and the diameter of the inner radial surface of the outer ring is less than 0.8 mm, preferably equal to 0.3 mm.

The framework is made from metal and the fitting is made from elastomer.

The seal is secured in rotation with the outer ring, which rotates.

The groove has a depth greater than 0.1 mm, preferably equal to 0.2 mm.

The invention also relates to a motor vehicle, comprising at least one release bearing as previously described.

BRIEF DESCRIPTION OF THE DRAWINGS

The invention will be better understood, and other advantages thereof will appear more clearly, in light of the following description of one embodiment of a rolling bearings according to its principle, provided solely as an example and done in reference to the appended drawings, in which.

DETAILED DESCRIPTION OF THE PRESENT INVENTION

Figure 1:
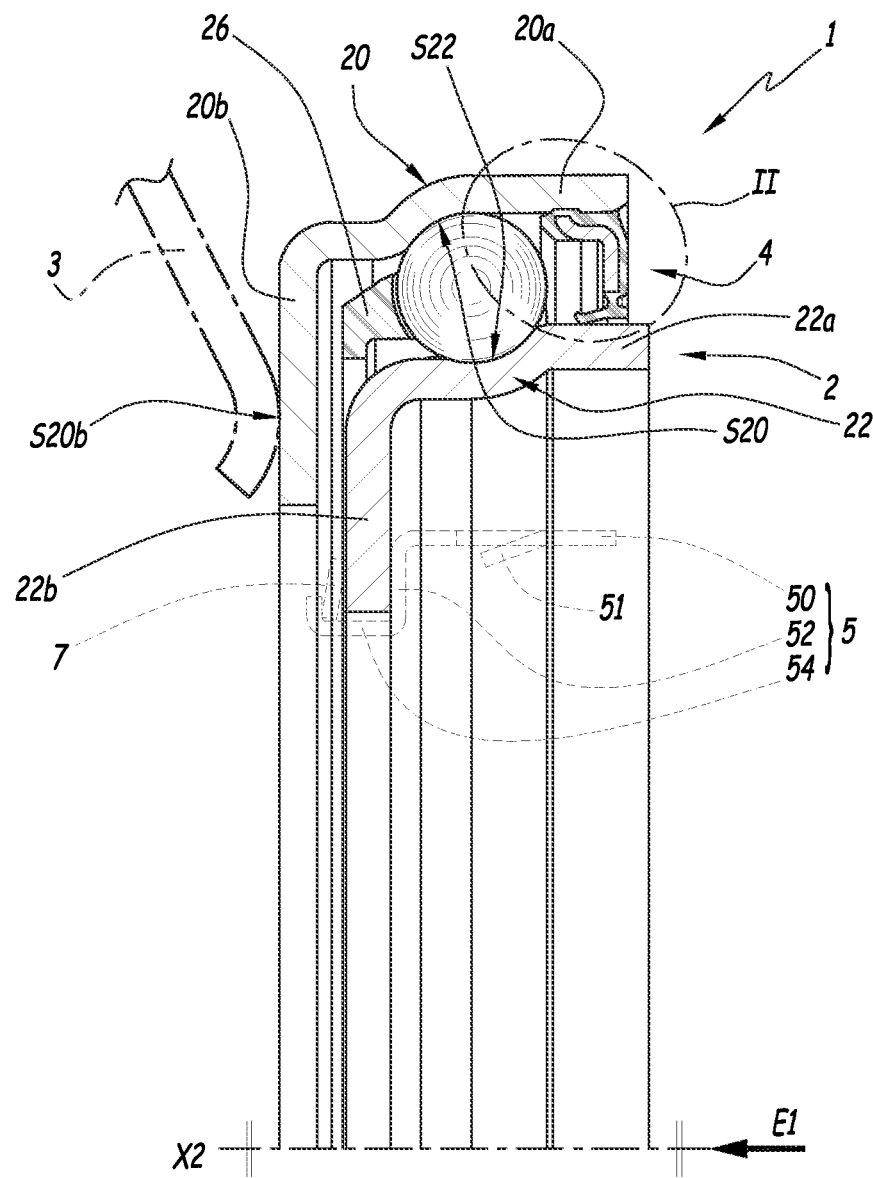
FIG. 1 is a half-sectional view of a release bearing according to the invention.

FIGS. 1 to 4 show an engagement-disengagement release bearing 1. This release bearing is designed to be mounted in a motor vehicle to transmit an axial force E1 exerted by a piston, not shown, toward a rotating transmission diaphragm, a nose 3 of which is shown in FIG. 1. In the example of FIG. 1, the diaphragm bears directly against the ring 20 on the left side of FIG. 1, but a wearing ring may also be inserted between the noses 3 and the ring 20.

The release bearing 1 comprises a rolling bearing 2 having a rotating outer ring 20 secured in rotation with the diaphragm and a non-rotating inner ring 22 between which a rolling chamber is defined. A single series of rolling bodies 24 is positioned in the rolling chamber, while being kept in position by a cage 26. In the example of the figures, the rolling bodies 24 are beads, but they may be needles or rollers.

Reference X2 denotes a central axis of the rolling bearing 2, i.e., the relative axis of rotation of the rings 20 and 22 with respect to one another. The rings 20 and 22 are centered on the axis X2.

In the rest of the description, a rear direction designates an axial direction, i.e., parallel to the axis X2, that is turned toward the piston, the piston being suitable for bearing on the right side of the rolling bearing 2 in FIG. 1. Conversely, a front direction designates an axial direction, opposite the aforementioned direction, that is turned toward the diaphragm or toward a clutch pressure plate, not shown.

The rotating ring 20 comprises an annular part 20b that is positioned in front, i.e., on the side of the noses 3, and that extends radially to the axis X2, and a tubular part 20a, which is positioned behind, and which extends globally parallel to the axis X2. The noses 3 of the diaphragm bear against a front face S20b of the front part 20b opposite the rolling chamber.

The inner ring 22 also comprises an annular part 22b, which is positioned in front and which extends radially to the axis X2, and a tubular part 22a, which extends backward globally parallel to the axis X2.

A sheet metal sleeve 5, shown in mixed lines in FIG. 1, is designed to maneuver the noses 3 of the diaphragm, by transmitting the force E1 from the piston to the rolling bearing 4. This sleeve 5 comprises a cylindrical part 50 that is positioned behind the sleeve 5, that is suitable for receiving the actuating piston of the clutch and is provided with several lances 51, regularly distributed around a central axis of the sleeve 5. The central axis of the sleeve 5 is in practice combined with the rolling axis X2. The lances 51 make it possible to attach the sleeve 5 on the piston. The sleeve 5 comprises a second cylindrical part 54, which is positioned in front of the sleeve 5, which is centered on the axis X2 and which includes a free edge curved radially outwardly, such that the sleeve 5 is crimped around the free edge of the front part 22b of the inner ring 22. In this way, the sleeve 5 and the ring 22 of the rolling bearing 2 are axially secured. The sleeve 5 lastly comprises an annular connecting part 52 between the parts 50 and 54, which is radial to the central axis of the sleeve, centrifugally, and which bears against a rear face of the front part 22b of the inner ring 22.

A lock washer 7, also shown in mixed lines, is positioned coaxially around the cylindrical part 54. More specifically, this lock washer 7 is inserted between the curved free edge of the part 54 and the front face of the part 22b of the ring 22.

References S20 and S22 respectively denote the rolling surfaces of the beads 24 on the ring 20 and on the ring 22. These surfaces S20 and S22 are curved, in the form of a toroid portion, with a curve radius equal to that of the beads 24. The rings 20 and 22 each extend toward the rear, relative to the surface S20 or S22, by a tubular part centered on the axis X2. Thus, reference S20$i$ denotes an inner radial surface of the part 20a, that inner radial surface S20$i$ extending the surface S20 toward the rear. Reference S22$e$ also denotes an outer radial surface of the part 22a, that outer radial surface S22$e$ extending the surface S22 toward the rear. Reference D20$i$ denotes the diameter of the surface S20$i$; in the example, the diameter is chosen to be equal to 62.49 mm.

A peripheral groove 21 is arranged on the inner radial surface S20$i$ of the ring 20. This groove 21 extends over the entire circumference of the ring 20 and has a globally V-shaped section with a flat bottom. The groove 21 comprises a bottom 21a and two side edges 21b. The two edges 21b are inclined relative to a direction radial to the axis X2 such that the width of the groove 21 decreases going from the mouth to the bottom 21a of the groove 21. Reference 12$l$ denotes the maximum width of the groove 21, i.e., the width measured at the mouth of the groove. The groove 21 has a depth p21, measured radially relative to the axis X2, which is greater than 0.1 mm, preferably equal to 0.2 mm.

In one embodiment of the invention that is not shown, the peripheral groove 21 may assume the form of a series of grooves delimited over predetermined angular sectors.

A seal 4 is mounted coaxially between the rings 20 and 22, behind the rolling bearing 2. This seal 4 is fastened to the outer ring 20 and is designed to isolate the rolling chamber from the outside, opposite the noses 3 of the diaphragm. It further makes it possible to keep the grease near the rolling bodies during operation. The seal 4 is inserted between the surfaces S20*i* and S22*e*. It comprises a framework 40 made from a relatively rigid material, for example metal. It also comprises a fitting 42 made from a flexible material, which may be made from synthetic elastomer or natural rubber. The fitting 42 may be overmolded on the framework 40 or attached by any other appropriate means, such as gluing or welding. The fitting 42 forms a lip 42*a* which, in the example, bears slidingly against the outer radial surface S22*e* of the ring 22. However, the lip 42*a* may not be in contact with the surface S22*e*, but extend at a small radial distance therefrom, i.e., be adjacent to the surface S22*e*.

Figure 3:
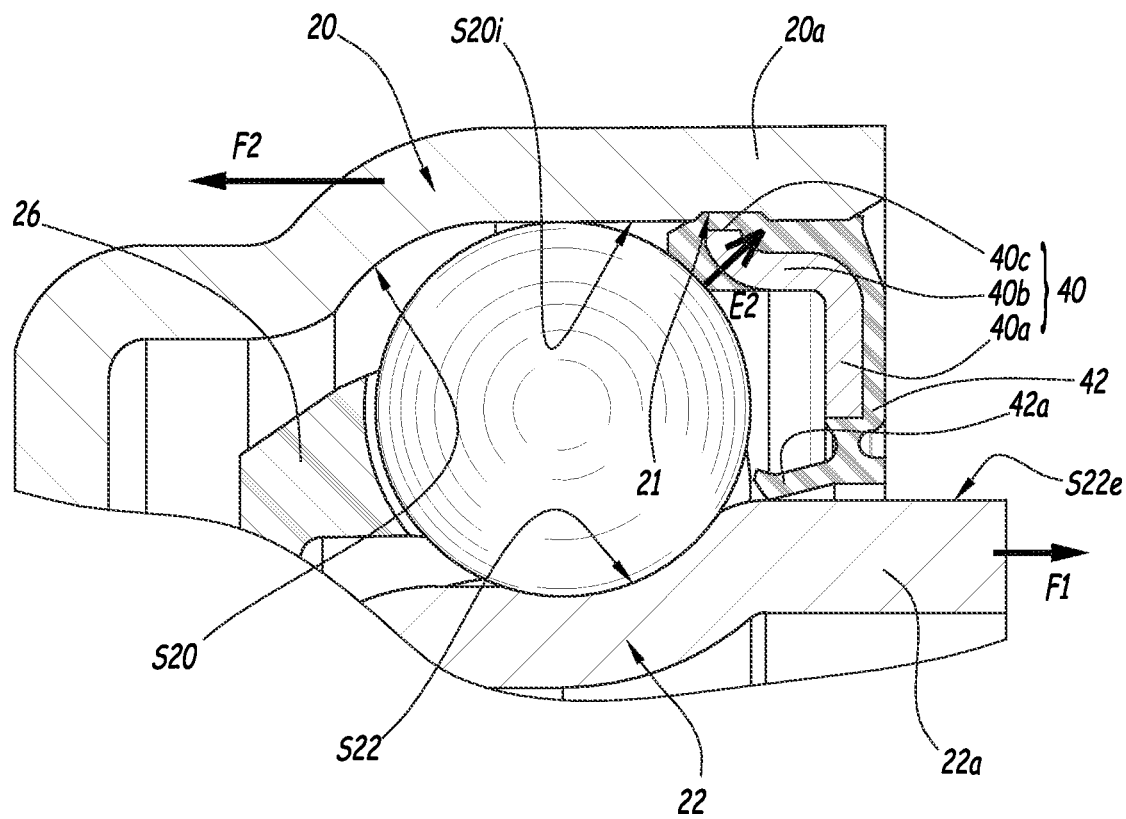
FIG. 3 is a partial sectional view of the release bearing of FIGS. 1 and 2, shown in a configuration where an axial separating force is applied on the rings of the rolling bearing.
Figure 4:
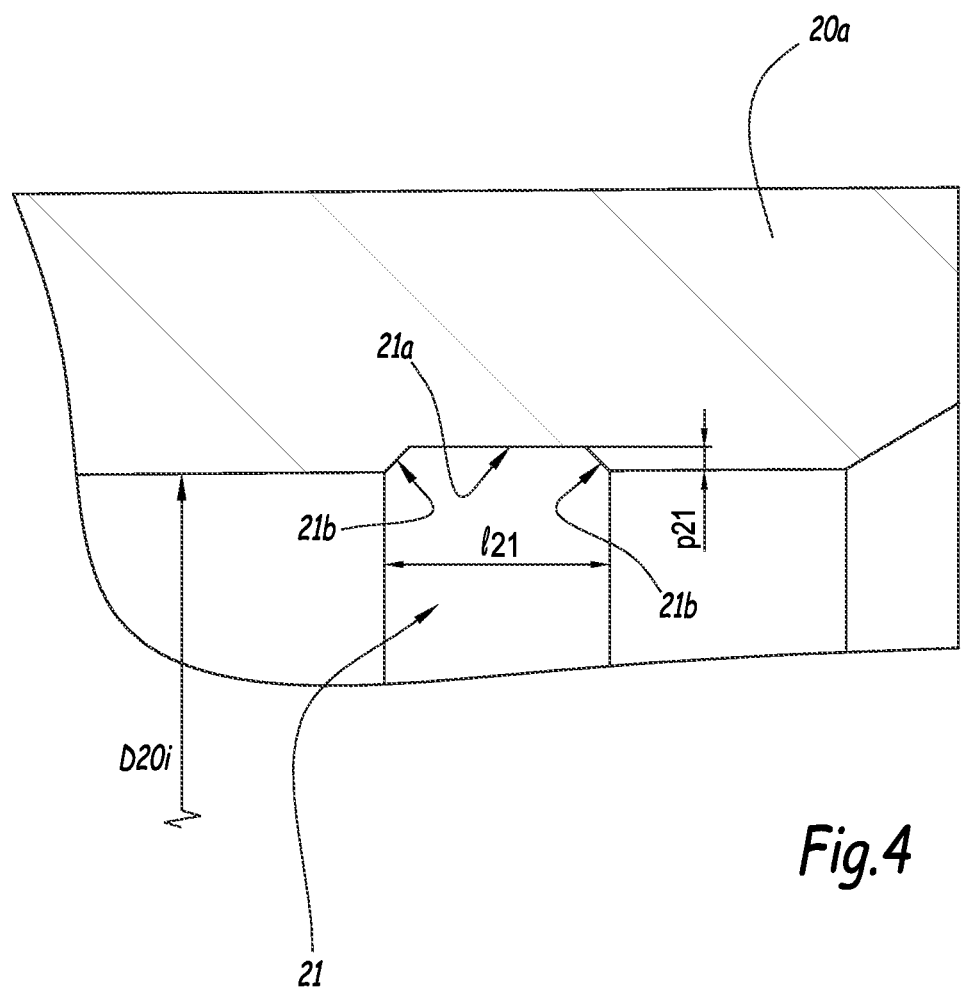
FIG. 4 is a view similar to FIG. 2, but enlarged, in which only the fastening ring of the seal is shown.

As more particularly shown in FIG. 3, the framework 40 comprises an annular part 40*a* that is radial with respect to the axis X2, as well as a tubular skirt 40*b* perpendicular to the part 40*a*, which extends that part 40*a* toward the front and which is centered on the axis X2. An outer edge 40*c* of the skirt 40 is folded down radially toward the outside toward the ring 20. That edge 40*c* is continuous over the circumference of the framework 40 and is folded down radially toward the peripheral groove 21. Reference D40*c* denotes the outer diameter of the framework 40, which corresponds to the outer diameter of the edge 40*c*.

In one embodiment of the invention that is not shown, the edge 40*c* may be discontinuous.

Figure 2:
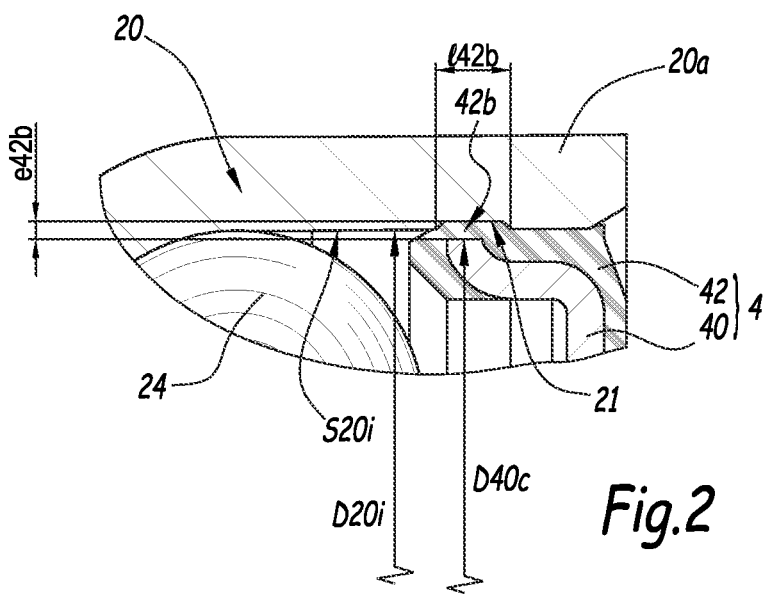
FIG. 2 is an enlarged view of circle II in FIG. 1, illustrating a ring for fastening a seal.

As shown in FIG. 2, the outer diameter D40*c* of the framework 40 is slightly smaller than the diameter D20*i* of the inner radial surface S20*i* of the outer ring 20. The folded down edge 40*c* is therefore withdrawn relative to the bottom of the groove 21. More specifically, the difference in diameter between the outer diameter D40*c* of the framework 40 and the diameter D20*i* of the inner radial surface S20*i* of the outer ring 20 is smaller than 0.8 mm, preferably equal to 0.3 mm.

Part 42*b* of the fitting 42 fills the groove 21. In fact, that part 42*b* has a radial thickness e42*b* that is larger than or equal to the depth p21 of the groove 21 and a width 142*b* that is greater than or equal to the maximum width 12*l* of the groove 21. In order to fill the groove 21, the part 42*b* may therefore be shaped to the geometry thereof or compressed. That portion 42*b* is jammed, due to the aforementioned difference in diameter, radially between the folded down edge 40*c* of the framework 40 and the bottom 21*a* of the groove 21. In this way, the seal 4 is axially secured to the ring 20.

When an axial separating force is exerted on the rings 20 and 22, as shown by arrows F1 and F2 in FIG. 3, the ring 20 tends to slide to the left in FIG. 3, which separates the beads 24 from the surface S20, the beads tending to slide toward the surface S20*i* relative to the ring 20. The beads 24 retain their axial position, along the axis X2, relative to the ring 22 because the surface S22 has a sufficient concavity to keep the beads 24 in position.

Thus, the beginning of the relative axial movement between the rings 20 and 22, in the direction of arrows F1 and F2, results in bringing the beads 24 toward the part 20*a*, then into contact with the seal 4. In this configuration shown in FIG. 3, the beads 24 exert a force E2 on the seal 4 normal to their surface. This force E2 is a reaction force that results in pushing the folded down edge 40*c* of the framework 40 toward the groove 21. This causes the compression of the part 42*b* of the fitting 42 inside the groove 21 on the one hand, and the shearing of that part 42*b* on the other hand.

In fact, the ring 20 exerts, on the fitting 42 of the seal 4, an adherence force, globally parallel to the axis X2 and oriented forward, while the reaction force E2 of the beads 24, which is opposite the axial separating force F1, F2 and which is transmitted to the part 42*b* of the fitting 42 by the folded down edge 40*c* of the framework 40, exerts, on the part 42*b*, a globally axial force oriented backward, i.e., opposite the adherence force between the fitting 42 and the ring 20. These two opposing forces therefore shear the component material of the part 42*b*.

The separating force of the rings 20 and 22 therefore results in the formation of a shear stress within the fitting 42. The latter being flexible, it withstands high shear forces, which gives the release bearing 1 a high resistance to disassembly.

In so doing, the beads 24 improve the anchoring of the seal 4 relative to the ring 20, which allows the seal 4 to withstand a reaction force, or separating force, exerted by the beads 24.

In other words, the cooperation of the part 42*b* of the fitting 42 with the groove 21, under the action of the folded down edge 40*c* of the framework 40, results in the seal 4 forming an effective release bearing for a beginning of axial separating movement of the rings 20 and 22, under the effect of the pulling out force represented by arrows F1 and F2 in FIG. 3.

It will be noted that the greater the pulling out force F1+F2 is, the more the beads 24 push the folded down edge 40*c* toward the inside of the groove 21 owing to the force E2, and the more the part 42*b* is compressed and sheared, which implies that the anchoring of the seal 4 on the ring 20 is that much more effective.

In the current case where the separating force of the rings 20 and 22 is essentially axial, the beads 24 act simultaneously over the entire circumference of the seal 4. However, in the case where the separating force between the rings 20 and 22 is not strictly parallel to the axis X2, i.e., in the case where that force is only partially axial, the beginning of relative movement of the rings 20 and 22 may result in only part of the beads 24 coming into contact with the seal 4. In that case, only one or several portions of the edge 40*c* compress(es) and/or shear(s) the part 42*b* against the groove 21. This is, however, sufficient to form a release bearing with respect to the separating or spacing movement of the rings 20 and 22 along the axis X2. It will be understood that, if the separating force is released, the ring 20 may return to the configuration of FIGS. 1 and 2, in which the beads 24 are separated from the seal 4.

The invention is described above and shown in the figures in the case where the seal 4 is mounted on the outer ring 20. Alternatively, this seal 4 may be mounted on the inner ring 22. In that case, the configuration of the seal is reversed and a groove similar to the groove 21 is arranged on the outer radial surface S22*e* of the inner ring 22 and the edge 40*c* of the framework 40 is folded down radially toward the inside, toward the axis X2.

The invention is described above in the case where the outer ring is rotating. It may also be implemented in the case where it is the inner ring that rotates.

The invention can also be used with a rolling release bearing, as described in WO-A-2010/031756.

The invention is described above in the case of its use for an engagement-disengagement release bearing. It is also applicable to other release bearings, particularly a suspension release bearing or a steering release bearing.

The technical features of the embodiments and alternatives considered above may be combined with one another to create new embodiments.

The invention claimed is:

1. An engagement-disengagement, suspension or steering release bearing, the release bearing comprising:

a rolling bearing forming a member transmitting an axial force and comprising a rotating ring and a non-rotating ring between which a rolling chamber for rolling bodies is defined; and a sealing gasket, wherein the sealing gasket is mounted on a first ring among the rotating and non-rotating rings, and wherein the sealing gasket comprises a framework, having an edge folded down radially toward a groove arranged on a surface of the first ring, and a fitting, having a sealing lip in sliding bearing one of against or adjacent to, a corresponding surface of a second ring among the other of the rotating and non-rotating rings, wherein the fitting of the sealing gasket is suitable for filling the groove of the first ring and part of the fitting is jammed between the folded down edge of the framework and the groove, wherein the part of the fitting jammed between the folded down edge of the framework and the groove is provided to be sheared during the application of an axial separating force applied on the first and second rings of the rolling bearing, wherein the rolling bodies are suitable for exerting a reaction force to the axial separating force on the sealing gasket, which are adapted to push the folded down edge of the framework toward the groove and shear the part of the fitting jammed between the folded down edge of the framework and the groove.

2. The release bearing according to claim 1, wherein the groove is arranged on an inner radial surface of the first ring.

3. The release bearing according to claim 2, wherein an outer diameter of the framework is slightly smaller than a diameter of the inner radial surface of the first ring.

4. The release bearing according to claim 1, wherein a difference in diameter between an outer diameter of the framework and a diameter of the surface of the first ring is equal to 0.3 mm.

5. The release bearing according to claim 1, wherein the framework is made from metal and the fitting is made from elastomer.

6. The release bearing according to claim 1, wherein the sealing gasket is secured in rotation with the first ring, which rotates.

7. The release bearing according to claim 1, wherein the groove has a depth greater than 0.1 mm.

8. The release bearing according to claim 1, wherein the groove has a depth equal to 0.2 mm.

9. An engagement-disengagement, suspension or steering release bearing, the release bearing comprising:

a rolling bearing forming a member transmitting an axial force and comprising a rotating ring and a non-rotating ring between which a rolling chamber for rolling bodies is defined; and a sealing gasket, wherein the sealing gasket is mounted on a first ring among the rotating and non-rotating rings, and wherein the sealing gasket comprises a framework, having an edge folded down radially toward a groove arranged on a surface of the first ring, and a fitting, having a sealing lip in sliding bearing one of against or adjacent to, a corresponding surface of a second ring among the other of the rotating and non-rotating rings, wherein the fitting of the sealing gasket is suitable for filling the groove of the first ring and part of the fitting is jammed between the folded down edge of the framework and the groove, wherein a difference in diameter between an outer diameter of the framework and a diameter of the surface of the first ring is smaller than 0.8 mm.

10. A motor vehicle, comprising at least one release bearing, each release bearing comprising:

a rolling bearing forming a member transmitting an axial force and comprising a rotating ring and a non-rotating ring between which a rolling chamber for rolling bodies is defined; and a sealing gasket, wherein the sealing gasket is mounted on a first ring among the rotating and non-rotating rings, and wherein the sealing gasket comprises a framework, having an edge folded down radially toward a groove arranged on a surface of the first ring, and a fitting, having a sealing lip in sliding bearing one of against or adjacent to, a corresponding surface of a second ring among the other of the rotating and non-rotating rings, wherein the fitting of the sealing gasket is suitable for filling the groove of the first ring and part of the fitting is jammed between the folded down edge of the framework and the groove, wherein the part of the fitting jammed between the folded down edge of the framework and the groove is provided to be sheared during the application of an axial separating force applied on the first and second rings of the rolling bearing, wherein the rolling bodies are suitable for exerting a reaction force to the axial separating force on the sealing gasket, which are adapted to push the folded down edge of the framework toward the groove and shear the part of the fitting jammed between the folded down edge of the framework and the groove, wherein the at least one release bearing is integrated into the motor vehicle.

\* \* \* \* \*